United States Patent
Yamamoto et al.

(10) Patent No.: US 10,153,501 B2
(45) Date of Patent: Dec. 11, 2018

(54) FUEL CELL SYSTEM AND CONTROL METHOD THEREFOR

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 491 days.

(21) Appl. No.: 14/932,056

(22) Filed: Nov. 4, 2015

(65) Prior Publication Data

US 2016/0141656 A1 May 19, 2016

(30) Foreign Application Priority Data

Nov. 14, 2014 (JP) .................. 2014-231195

(51) Int. Cl.
| | |
|---|---|
| H01M 8/04 | (2016.01) |
| H01M 8/04119 | (2016.01) |
| H01M 8/04089 | (2016.01) |
| H01M 8/0438 | (2016.01) |
| H01M 8/04828 | (2016.01) |
| H01M 8/04746 | (2016.01) |
| H01M 8/0432 | (2016.01) |
| H01M 8/04492 | (2016.01) |
| H01M 8/04992 | (2016.01) |
| H01M 8/1018 | (2016.01) |

(52) U.S. Cl.
CPC ..... *H01M 8/04156* (2013.01); *H01M 8/0441* (2013.01); *H01M 8/04097* (2013.01); *H01M 8/04164* (2013.01); *H01M 8/04179* (2013.01); *H01M 8/04358* (2013.01); *H01M 8/04373* (2013.01); *H01M 8/04388* (2013.01); *H01M 8/04395* (2013.01); *H01M 8/04402* (2013.01); *H01M 8/04492* (2013.01); *H01M 8/04507* (2013.01); *H01M 8/04753* (2013.01); *H01M 8/04761* (2013.01); *H01M 8/04828* (2013.01); *H01M 8/04835* (2013.01); *H01M 8/04992* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2007/0259243 | A1 | 11/2007 | Jufuku et al. |
| 2009/0280371 | A1 | 11/2009 | Katano |
| 2011/0212371 | A1 | 9/2011 | Itoga |
| 2013/0157161 | A1 | 6/2013 | Matsusue |
| 2015/0125767 | A1 | 5/2015 | Wake et al. |
| 2016/0141660 | A1 | 5/2016 | Yamamoto et al. |

FOREIGN PATENT DOCUMENTS

| | | |
|---|---|---|
| JP | 2007-115460 | 5/2007 |
| JP | 2008-171770 | 7/2008 |
| JP | 2009-151999 A | 7/2009 |
| JP | 2010-003412 A | 1/2010 |
| JP | 2010-135194 A | 6/2010 |

OTHER PUBLICATIONS

Notice of Allowance and Fee(s) Due and Notice of Allowability issued in U.S. Appl. No. 14/937,707 dated Jun. 19, 2017.
U.S. Appl. No. 14/937,707, filed Nov. 10, 2015.

*Primary Examiner* — Ladan Mohaddes
(74) *Attorney, Agent, or Firm* — Finnegan, Henderson, Farabow, Garrett & Dunner, LLP

(57) ABSTRACT

There are provided a an anode-side water discharge controller that controls a circulation flow rate of the anode gas pump so as to discharge anode-side liquid water residing in the anode-side flow path, and a cathode-side water discharge controller that controls a supply flow rate of the cathode gas pump so as to discharge cathode-side liquid water residing in the cathode-side flow path. The anode-side water discharge controller and the cathode-side water discharge controller execute water discharge by running a pre-selected one of the anode gas pump and the cathode gas pump, and then running the other of the anode gas pump and the cathode gas pump.

10 Claims, 10 Drawing Sheets

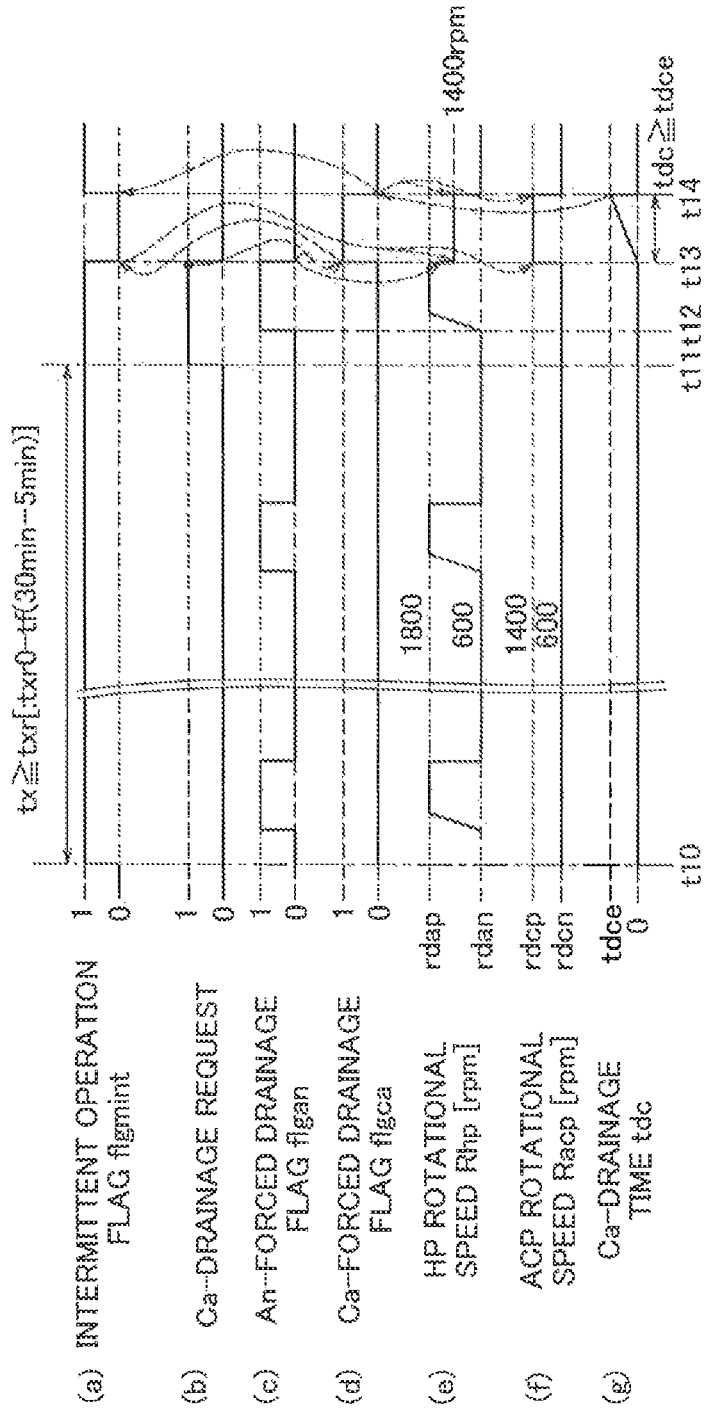

FUEL CELL SYSTEM AND CONTROL METHOD THEREFOR

CROSS-REFERENCE TO RELATED APPLICATIONS

This application claims priority based on Japanese Patent Application No. 2014-231195 filed on Nov. 14, 2014, all of the disclosures of which are incorporated herein by reference.

BACKGROUND

Field

The present invention relates to a fuel cell system and a control method therefor.

Related Art

Regarding a fuel gas supply system for supplying a fuel gas (hydrogen) to an anode of a fuel cell (fuel cell stack), there has conventionally been developed a fuel cell system in which fuel gas that has not been consumed by the anode of the fuel cell is circulated to the fuel gas supply system via a circulation pump of a fuel gas circulation system. As an example of this fuel cell system having a fuel gas circulation system, it is disclosed in JP2007-115460A that liquid water condensed on a pipe inner wall of a fuel gas circulation system is discharged by increasing the rotation speed of the circulation pump so as to reduce the possibility that excess liquid water may flow into the circulation pump. Also, it is disclosed in JP2008-171770A that the sounds accompanying the drive of a circulation pump (hydrogen pump) are masked with the sounds accompanying the drive of a compressor or a motor that serves as a load for a fuel cell.

However, in cases where a low-load operation of the fuel cell system is continued for a long time such as where a low-load power generation is continued for a long time, a low-rotation operation of the circulation pump, when continued for a long time, may cause liquid water to reside inside the fuel cell or at particular sites in a fuel gas circulation system, particularly from an outlet of a gas-liquid separator to a suction port of the circulation pump. For example, there are cases where liquid water resides as a result of condensation due to temperature differences between the fuel cell and the circulation pump or liquid water sucked from within the gas-liquid separator by the circulation pump. With this residing water over a specified quantity, there may occur biting of the residing water in the circulation pump during high rotation of the circulation pump. This may lead to generation of abnormal noise or high volume of sounds accompanying the drive of the circulation pump (hereinafter, also referred to as 'abnormal noise or the like'), thereby problematically giving the user a sense of discomfort or a sense of incompatibility, anxiety for faults and the like.

In addition, when the volume of the residing water in the fuel cell's anode increases, there are problems like a state of insufficient fuel gas supply occurring during high-load power generation, thus leading to a reduction in the voltage of the fuel cell and to a degradation of the electrodes due to oxidation (carbon oxidation).

There are also cases where water discharge is performed not only for the fuel cell's anode-side fuel gas flow path through an increase in the rotational speed of the circulation pump in the fuel gas circulation system, but also for the fuel cell's cathode-side oxidizing gas flow path via the oxidizing gas discharge system through an increase in the rotational speed of the air compressor in the oxidizing gas supply system that supplies the oxidizing gas (airborne oxygen) to the fuel cell's cathode. In this case, there may problematically cause the user to have a sense of discomfort or a sense of incompatibility, anxiety for faults and the like, due to the operation sound that is generated during the anode-side water discharge and the operation sound that is generated during the cathode-side water discharge, especially due to how these operation sounds occur.

SUMMARY

The present invention has been created to solve at least part of the problems described above, and it is possible to realize that through the following aspects.

(1) According to a first aspect, there is provided a fuel cell system. The fuel cell system comprises: a fuel cell; an anode gas supply flow path that supplies anode gas to the fuel cell; an anode gas discharge flow path that discharges anode off-gas from the fuel cell; an anode gas circulation flow path that connects the anode gas supply flow path and the anode gas discharge flow path; an anode gas pump that is installed in the anode gas circulation flow path, and that supplies the anode off-gas to the anode gas supply flow path; an anode-side water discharge controller that controls a circulation flow rate of the anode gas pump so as to discharge anode-side liquid water residing in the anode-side flow path; a cathode gas supply flow path that supplies cathode gas to the fuel cell; a cathode gas pump that is installed in the cathode gas supply flow path, and that supplies the cathode gas to the fuel cell; and a cathode-side water discharge controller that controls a supply flow rate of the cathode gas pump so as to discharge cathode-side liquid water residing in the cathode-side flow path. The anode-side water discharge controller and the cathode-side water discharge controller execute water discharge by running a pre-selected one of the anode gas pump and the cathode gas pump, and then running the other of the anode gas pump and the cathode gas pump.

According to the fuel cell system in this aspect, for example, by selecting in advance the pump with the louder operation sound to start operating first, it is possible to first execute water discharge with the louder operation sound and then execute water discharge with the quieter operation sound. This will cause the operation sound during water discharge to transition from louder to quieter, and thus make it possible to reduce a sense of discomfort or a sense of incompatibility, anxiety for faults and the like.

(2) In the fuel cell system, when a cathode-side water discharge request is generated, the cathode-side water discharge controller may perform control such that: (a) if the anode-side water discharge controller has already started discharge of the anode-side liquid water, then the cathode-side water discharge controller executes discharge of the cathode-side liquid water after the discharge of the anode-side liquid water is completed; and (b) if the anode-side water discharge controller has not yet started discharge of the anode-side liquid water, then the cathode-side water discharge controller executes discharge of the cathode-side liquid water after discharge of the anode-side liquid water is started and completed by the anode-side water discharge controller.

According to the fuel cell system in this aspect, because the water discharge of the cathode side with the quieter operation sound is executed after the water discharge of the anode side with the louder operation sound, it is possible to reduce a sense of discomfort or a sense of incompatibility, anxiety for faults and the like.

(3) In the fuel cell system, the anode-side water discharge controller may estimate an amount of residing water that resides in the anode gas pump based on the circulation flow rate of the anode gas pump, and execute discharge of the anode liquid water when the amount of the residing water is equal to or greater than a predetermined value According to the fuel cell system in this aspect, it is possible to perform discharge of the anode-side liquid water when the amount of the liquid water residing in the anode gas pump reaches a predetermined value, thereby suppressing the generation of abnormal noise, etc., in the operation sound of the anode gas pump when the amount of the liquid water in the anode gas pump has increased. It is also possible to suppress a reduction in the voltage of the fuel cell and a degradation of the electrodes due to oxidation, which may occur when the amount of the residing liquid water in the fuel cell's anode has increased and thus leads to insufficient anode gas supply to the anode.

(4) In the fuel cell system, the anode-side water discharge controller may estimate the amount of residing water that resides in the anode gas pump based on the circulation flow rate of the anode gas pump with reference to pre-prepared relationship between the circulation flow rate of the anode gas pump and the amount of residing water that resides in the anode gas pump.

According to the fuel cell system of this aspect, it is possible to easily estimate the amount of residing liquid water in the anode gas circulation flow path, and easily determine whether or not the amount of residing liquid water is equal to or greater than the predetermined value.

(5) In the fuel cell system, the anode gas pump may be a pump that changes the circulation flow rate of the anode gas through its rotation, and the cathode gas pump may be a compressor that changes the supply flow rate of the cathode gas through its rotation.

The present invention may be implemented in various aspects, for example, as a fuel cell system or a control method for a fuel cell system.

BRIEF DESCRIPTION OF DRAWINGS

FIG. 11 is a time chart showing a specific example of the cathode-side forced water discharge process.

DESCRIPTION OF THE EMBODIMENTS

A. Embodiments

Figure 1:
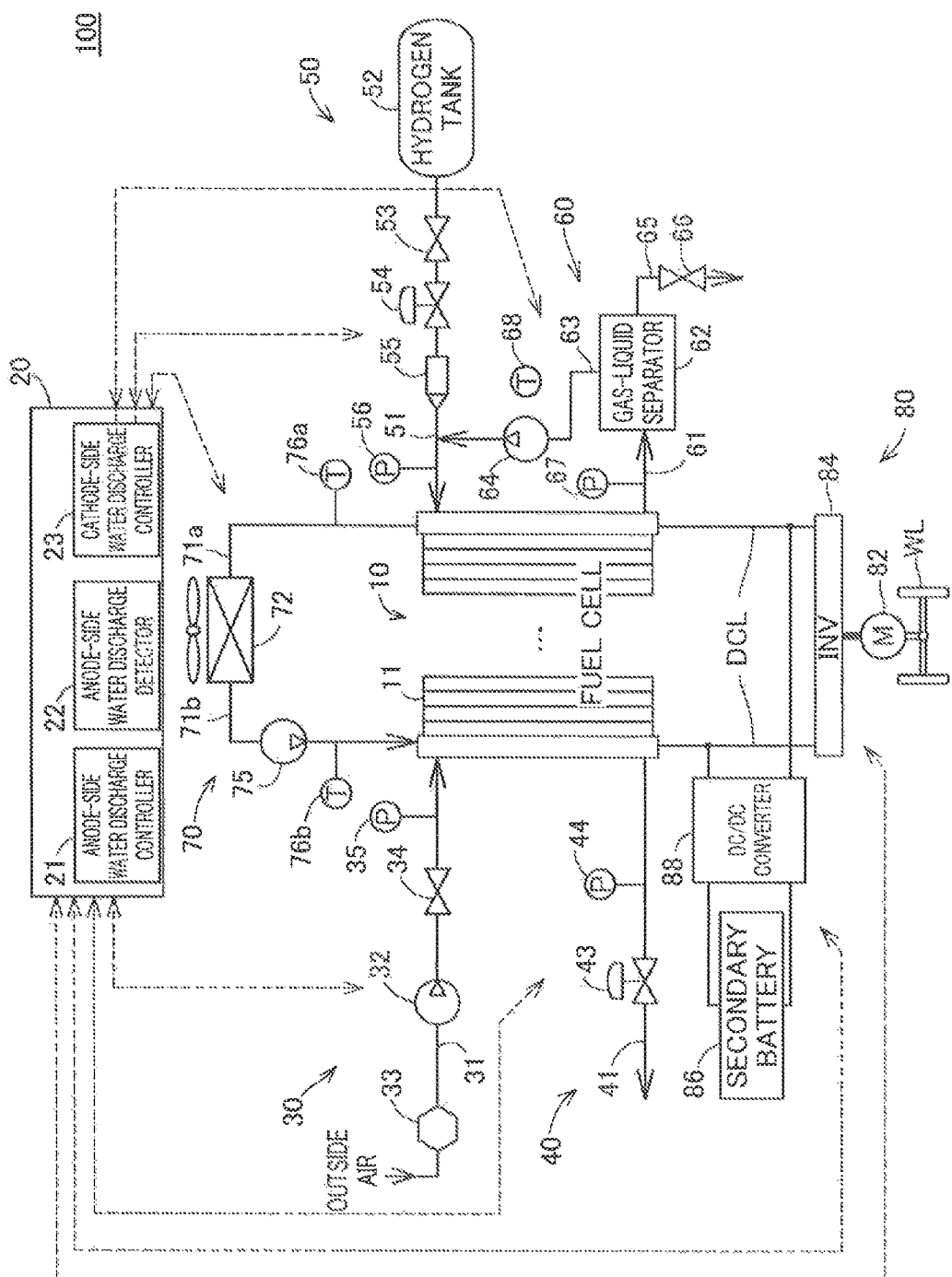
FIG. 1 is a schematic diagram showing a configuration of a fuel cell system according to one embodiment of the present invention.

A1. Configuration of the Fuel Cell System:

FIG. 1 is a schematic diagram showing a configuration of a fuel cell system 100 according to one embodiment of the present invention. In the present embodiment, the fuel cell system 100 is mounted on a vehicle (also referred to as a "fuel cell vehicle"). In response to a request based on the driver of the vehicle using the accelerator pedal (not shown) (hereinafter also referred to as the "accelerator position"), the fuel cell system 100 outputs electric power as a power source for the vehicle.

The fuel cell system 100 is equipped with a fuel cell 10, a controller 20, a cathode gas supply system 30, a cathode gas discharge system 40, an anode gas supply system 50, an anode gas circulation system 60, a coolant circulation system 70, and a power charge/discharge system 80.

The fuel cell 10 is a polymer electrolyte fuel cell that generates electric power by receiving a supply of hydrogen as the fuel gas (also referred to as the "anode gas") and air (strictly oxygen) as the oxidizing gas (also referred to as the "cathode gas"). Hereinafter, the anode gas and cathode gas are also collectively referred to as "reaction gases". The fuel cell 10 has a structure in which a plurality of unit cells 11 are stacked. In the present embodiment, the fuel cell 10 is a so-called "counter-flow type", with the anode gas and cathode gas flowing in opposite directions. Typically, the fuel cell 10 is arranged so that the anode gas flows from the upper side toward the lower side, the along the surface of each single cell 11, and the cathode gas flows from the lower side toward the upper side. Manifolds are also formed in the fuel cell 10 for the reaction gases and cooling medium as through-holes that pass along the stacking direction, but a diagram of that has been omitted.

Although a diagram has been omitted, a unit cell 11 basically has a structure wherein a Membrane-Electrode Assembly (MEA) as a power generator is sandwiched by separators. This MEA is comprised of a polymer electrolyte membrane (also simply referred to as an "electrolyte membrane") made up of an ion exchange membrane, an anode consisting of a catalyst layer and a gas diffusion layer formed on the surface of the anode side of the electrolyte membrane, and a cathode consisting of a catalyst layer and a gas diffusion layer formed on the surface of the cathode side of the electrolyte membrane. Groove-shaped gas flow paths in which the anode gas and cathode gas flow are also formed on the surfaces that are in contact with the separators and the gas diffusion layers. However, in some cases, a separate gas flow path unit may be installed between the separator and the gas diffusion layer.

The controller 20 is a control device that controls the cathode gas supply system 30, the cathode gas discharge system 40, the anode gas supply system 50, the anode gas circulation system 60 and the coolant circulation system 70 so as to make the fuel cell 10 to generates power in accordance with output requests from outside the system. The controller 20 is a microcomputer that includes, for example, a CPU, ROM, and RAM, etc., and, by running the software that corresponds to a variety of controls, is able to carry out the functions of the overall controller, the cathode gas controller that controls the cathode gas supply system 30 and the cathode gas discharge system 40, the anode gas controller that controls the anode gas supply system 50 and the anode gas circulation system 60, and the coolant controller that controls the coolant circulation system 70. FIG. 1 shows an anode-side water discharge controller 21, an anode-side water discharge detector 22, and a cathode-side water discharge controller 23.

The cathode gas supply system 30 is equipped with cathode gas supply piping 31, an air compressor 32, an air flow meter 33, an open/close valve 34 and a pressure measuring unit 35. The cathode gas supply piping 31 is connected to the cathode gas supply manifold of the fuel cell 10.

The air compressor 32 is connected to the fuel cell 10 via the cathode gas supply piping 31. The air compressor 32 supplies air, which has been taken in from outside and compressed, as cathode gas to the fuel cell 10. The airflow meter 33, situated on the upstream side of the air compressor 32, measures the amount of outside air that the air compressor 32 takes in and sends that data to the controller 20. Based on this measured value, the controller 20 operates the air compressor 32 to control the amount of air supplied to the fuel cell 10. Incidentally, the cathode gas supply piping 31 is also referred to as a "cathode gas supply flow path", and the air compressor 32 is also referred to as a "cathode gas pump".

The open/close valve 34 is installed between the air compressor 32 and the fuel cell 10. The open/close valve 34 is typically in a closed state, and it opens when air of a predetermined pressure is supplied from the air compressor 32 to the cathode gas supply piping 31. The pressure measuring unit. 35 measures the pressure of the air supplied from the air compressor 32 in the vicinity of the inlet to the cathode gas supply manifold of the fuel cell 10, and outputs that data to the controller 20.

The cathode gas discharge system 40 is equipped with cathode exhaust gas piping 41, a pressure regulating valve 43 and a pressure measuring unit 44. The cathode exhaust gas piping 41 is connected to the cathode gas discharge manifold of the fuel cell 10. The cathode exhaust gas (also referred to as "cathode off-gas") is discharged to the outside of the fuel cell system 100 via the cathode exhaust gas piping 41.

The pressure regulating valve 43 is controlled by the controller 20 to set its degree of opening to adjust the pressure of the cathode exhaust gas (the back pressure at the cathode side of the fuel cell 10) in the cathode exhaust gas piping 41. The pressure measuring unit 44 is installed upstream of the pressure regulating valve 43, it measures the pressure of the cathode exhaust gas, and it outputs the results of that measurement to the controller 20. The controller 20 controls the back pressure of the cathode side of the fuel cell 10 based on the measured values from the pressure measuring unit 44 by adjusting the degree of opening of the pressure regulating valve 43.

The anode gas supply system 50 is equipped with an anode gas supply piping 51, a hydrogen tank 52, an open/close valve 53, a regulator 54, a hydrogen supply device 55 and a pressure measuring unit 56. The hydrogen tank 52 is connected to an inlet of an anode gas supply manifold (diagram omitted) of the fuel cell 10 via the anode gas supply piping 51, and it supplies the fuel cell 10 with the hydrogen contained in the tank. Incidentally, the anode gas supply piping 51 is also referred to as the "anode gas supply flow path".

The open/close valve 53, the regulator 54, the hydrogen supply device 55 and the pressure measuring unit 56 are installed, in that order, from the upstream side (the hydrogen tank 52 side) on the anode gas supply piping 51. The open/close valve 53 is opened and closed through commands from the controller 20, and it controls the flow of hydrogen from the hydrogen tank 52 to the upstream side of the hydrogen supply device 55. The regulator 54 is a pressure reducing valve for adjusting the pressure of the hydrogen upstream of the hydrogen supplying device 55, and the degree of its opening is controlled by the controller 20.

The hydrogen supply device 55 may, for example, be comprised of an injector that is an electromagnetic drive type open/close valve. The pressure measuring unit 56 measures the pressure of the hydrogen on the downstream side of the hydrogen supply device 55 and sends that data to the controller 20. The controller 20 controls the flow rate of the hydrogen supplied to the fuel cell 10 by controlling the hydrogen supply device 55 based on the values measured by the pressure measuring unit 56.

The anode gas circulation system 60 is equipped with anode exhaust gas piping 61, a gas-liquid separator 62, anode gas circulation piping 63, a hydrogen circulation pump 64, anode water discharge piping 65, a water discharge valve 66, a pressure measuring unit 67 and a temperature measuring unit 68. The anode gas circulation system 60 performs circulation and discharge of the anode exhaust gas (also referred to as "anode off-gas") that contains drained water as well as unreacted gas (hydrogen, nitrogen, etc.) that was not used in the power generation reaction and discharged from the anode of the fuel cell 10.

The anode exhaust gas piping 61 connects the gas-liquid separator 62 to the outlet of the anode gas discharge manifold of the fuel cell 10 (diagram omitted). The gas-liquid separator 62 is also connected to the anode gas circulation piping 63 and the anode water discharge piping 65. The gas-liquid separator 62 separates the gas components and liquid water that is contained in the anode exhaust gas, and it guides the gas components to the anode gas circulation piping 63 while guiding the liquid water to the anode water discharge piping 65. Incidentally, the anode exhaust piping 61 is also referred to as an "anode gas discharge flow path".

The anode gas circulation piping 63 is connected to the anode gas supply piping 51 at the downstream side of the hydrogen supply device 55. The hydrogen circulation pump 64 is installed on the anode gas circulation piping 63. The hydrogen contained in the gas components that is separated by the gas-liquid separator 62 is fed by the hydrogen circulation pump 64 to the anode gas supply piping 51, where it is reused as anode gas. Incidentally, the anode gas circulation piping 63 is also referred to as an "anode gas circulation flow path", and the hydrogen circulation pump 64 is also referred to as an "anode gas pump".

The anode water discharge piping 65 is for draining the liquid water that is separated in the gas-liquid separator 62 to the outside of the fuel cell system 100. The drain valve 66 is installed on the anode water discharge piping 65. The controller 20 typically keeps the drain valve 66 closed, and opens the drain valve 66 at a predetermined water discharge timing that is set in advance, and at the timing for discharging the inert gas within the anode exhaust gas. Incidentally, the gas-liquid separator 62 is also referred to as a "water discharge mechanism".

The pressure measuring unit 67 for the anode gas circulation system 60 is installed on the anode exhaust gas piping 61. The pressure measuring unit 67 measures the pressure of the anode exhaust gas (the back pressure of the anode side of the fuel cell 10) in the vicinity of the outlet of the anode gas discharge manifold of the fuel cell 10, and sends that data to the controller 20. The controller 20 controls the supply of hydrogen to the fuel cell 10 based on the value measured by the pressure measuring unit 67 in the anode gas circulation system 60, and on the values measured by the pressure measuring unit 56 in the anode gas supply system 50 described above.

The temperature measuring unit 68 in the anode gas circulation system 60 further measures, as the outside air temperature, the ambient temperature of the anode gas circulation system 60, in particular, the ambient temperature of the hydrogen circulation pump 64 (outside temperature), and sends that data to the controller 20. The controller 20 controls the rotational speed of the hydrogen circulation pump 64 based on the values measured by the temperature 68, as described later.

The coolant circulation system 70 is equipped with upstream piping 71a, downstream piping 71b, a radiator 72, a coolant circulation pump 75, an upstream temperature sensor 76a and a downstream temperature sensor 76b. The upstream piping 71a and the downstream piping 71b are both cooling pipes for circulating coolant that cools the fuel cell 10. The upstream piping 71a connects the inlet of the radiator 72 to the outlet of the coolant water discharge manifold (diagram omitted) of the fuel cell 10. The downstream piping 71b connects the outlet of the radiator 72 to the inlet of the coolant supply manifold (diagram omitted) of the fuel cell 10.

The radiator 72 cools the coolant through heat exchange between the outside air and the coolant flowing through the coolant piping 71. The coolant circulation pump 75 is installed along the downstream piping 71b, and it sends coolant that has been cooled in the radiator 72 to the fuel cell 10. The upstream temperature sensor 76a is installed on the upstream piping 71a, and the downstream temperature sensor 76b is installed on the downstream piping 71b. The upstream temperature sensor 76a and the downstream temperature sensor 76b both transmit the measured temperature of the coolant to the controller 20. The controller 20 controls the operation of the radiator 72 based on the values (temperature of the coolant) measured by the upstream temperature sensor 76a and the downstream temperature sensor 76.

The power charge/discharge system 80 is equipped with a drive motor 82 as a load device, an inverter (INV) 84, a second battery 86 and a DC-DC converter 88. The fuel cell 10 is connected electrically to the inverter 84 via the DC wires "DCL", and the second battery 86 is connected electrically to the DC wires "DCL" via the DC-DC converter 88.

The second battery 86 is charged by the output power for the fuel cell 10 and the regenerative power of the drive motor 82, and it functions as a power source along with the fuel cell 10. The second battery 81 may be, for example, a lithium ion battery.

Based on commands from the controller 20, the DC-DC converter 88 controls the current and voltage of the fuel cell 10 and the charging and discharging of the second battery 81, and it variably adjusts the voltage level of the DC wires "DCL". The inverter 84 converts the DC power obtained from the fuel cell 10 and the second battery 81 to AC power, and supplies it to the drive motor 82. The drive motor 82 operates in response to the power supplied from the inverter 84 in response to the accelerator position, and it drives the wheels WL that are connected via gears or the like. When regenerative power is generated by the drive motor 82, the inverter 84 also converts that regenerative power into DC power and charges the second battery 86 via the DC-DC converter 88.

The fuel cell system 100 described above has its cathode gas supply system 30, cathode gas discharge system 40, anode gas supply system 50, anode gas circulation system 60 and power charge/discharge system 80 all controlled by the controller 20, and it may output electric power as a power source for the vehicle from the fuel cell 10 in accordance with the accelerator position. Descriptions will be made later about the water discharge process for the anode gas circulation flow path and the water discharge process for the cathode gas supply and discharge flow paths that are executed during operation of the fuel cell system 100.

Figure 2:
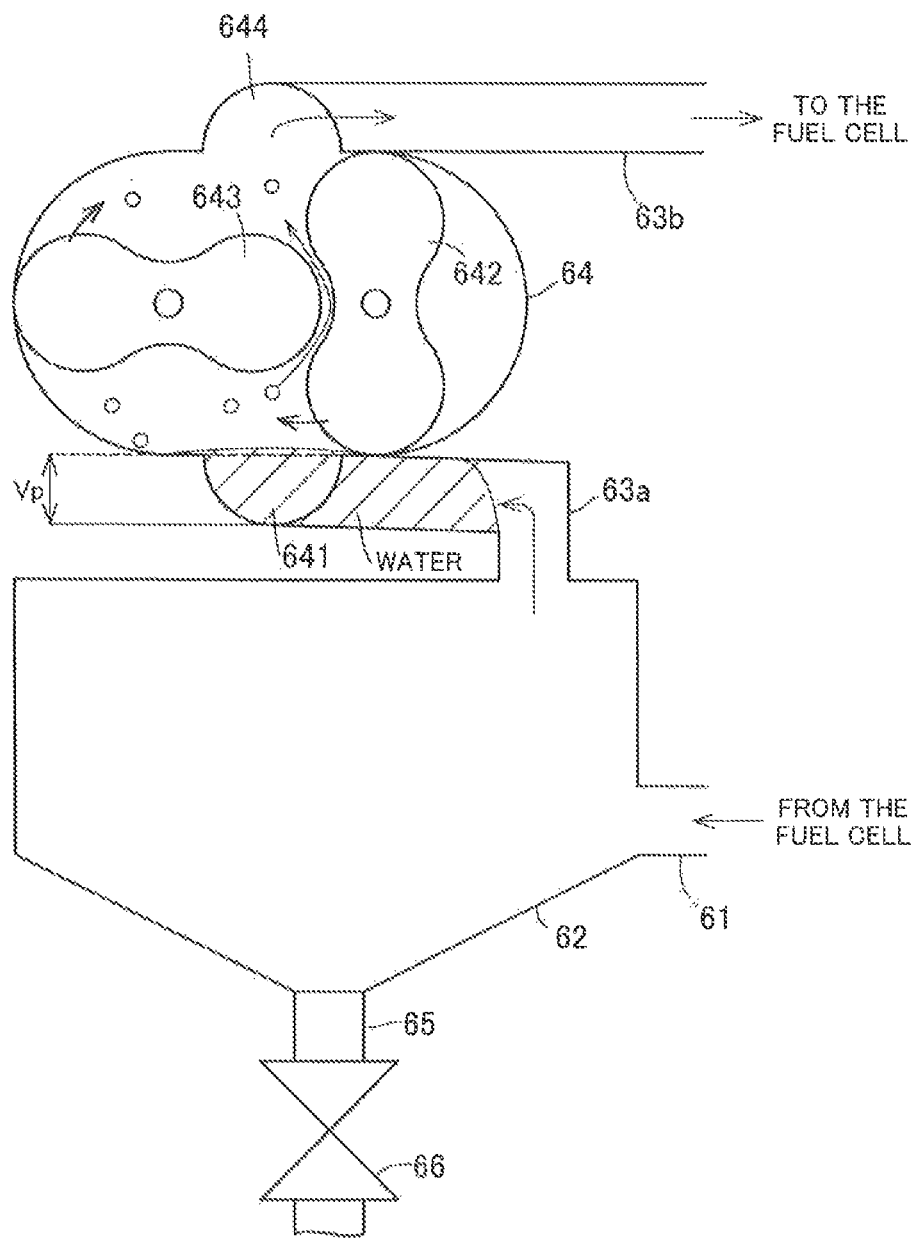
FIG. 2 is an explanatory diagram showing an enlarged view of a hydrogen circulation pump and a gas-liquid separator in an anode gas circulation system.

FIG. 2 is an explanatory diagram showing an enlarged view of the hydrogen circulation pump 64 and the gas-liquid separator 62 in the anode gas circulation system 60. The anode exhaust gas piping 61, which is connected to the outlet of the anode gas discharge manifold (not shown) on the lower part of the fuel cell 10, is connected to the lower portion of the gas-liquid separator 62. First anode gas circulation piping 63a, which is connected to the top (vertically) of the gas-liquid separator 62, is connected to a suction port 641 on the bottom (vertically) of the hydrogen circulation pump 64. Second anode gas circulation piping 63b, which is connected to a delivery port 644 on the top of the hydrogen circulation pump 64, is connected to the anode gas supply piping 51 (not shown), and to the inlet of the anode gas supply manifold (not shown) on the upper portion of the fuel cell 10. In other words, the hydrogen circulation pump 64 has a structure wherein it delivers the hydrogen, which is sucked in from the suction port 641 at its bottom, from the delivery port 644 on its top.

When the hydrogen circulation pump 64 continues to operate at a low rotational speed, liquid water may accumulate within the area from the gas-liquid separator 62 to the hydrogen circulation pump 64, in other words, in the first anode gas circulation piping 63a and at the suction port 641 of the hydrogen circulation pump 64, and then overflow inside the hydrogen circulation pump 64 itself. This residing water is mainly generated in the following cases. First, if the temperature of the hydrogen circulation pump 64 is lower than the temperature of the fuel cell 10, water condensation occurs due to that difference in temperatures. Then, if the hydrogen circulation pump 64 is operating at a low rotational speed, the circulation flow rate of the hydrogen flowing through the anode gas circulation piping 63 is decreased in accordance with that rotational speed, and it becomes impossible for the pump to lift the condensed water and drain it from the delivery port 644. For this reason, liquid water will accumulate at the bottom of the hydrogen circulation pump 64, in other words, in the first anode gas circulation piping 63a and at the suction port 641 of the hydrogen circulation pump 64. The accumulation of liquid water may also be caused by the hydrogen circulation pump 64 sucking up any liquid water that is retained in the gas-liquid separator 62, by the liquid water that is drained from the fuel cell 10, separated by the gas-liquid separator 62, and directly sucked up by the hydrogen circulation pump 64 without accumulating at the bottom of the gas-liquid separator 62, or by trickle down of liquid water from the delivery port 644 side of the hydrogen circulation pump 64.

As the residing water at the suction port 641 of the hydrogen circulation pump 64 becomes larger in amount, there may occur water biting at impellers 642, 643 of the hydrogen circulation pump 64, which may cause changes in operational noise of the hydrogen circulation pump 64 and incur generation of abnormal noise.

A continued state of low rotational speed for the hydrogen circulation pump 64 is likely to occur in the case wherein the fuel cell 10 is continuously generating a minute amount of power. Notable as one operation where such a state of minute power generation is utilized is, for example, in the case where, unlike the conventional intermittent operation wherein the periods of power generation and non-power generation appear alternately, there is operation that maintains a state of minute power generation for a period of time (which corresponds to the period of non-power generation during intermittent operation), but without completely stopping power generation (hereinafter, also referred to as "micropower intermittent operation"). In other words, with micropower intermittent operation, there are alternating periods in which the fuel cell 10 performs power generation at a high power output and then generates power at a minute power output.

If that state of minute power generation continues, there is a possibility that the liquid water that is produced during power generation is turned into steam at the cathode of each cell 11 of the fuel cell 10, that steam then travels to the anode side, condenses inside the anode gas flow path, and accumulates inside that anode gas flow path. If the amount of this residing water (also referred to as "anode-side residing water" or "anode-side liquid water") increases, as described in the Background section, the amount of anode gas required to perform high-load power generation (fuel gas) is not supplied, a state of insufficient fuel gas occurs, thus leading to a reduction in the voltage of the fuel cell 10 and in a degradation of the electrodes due to oxidation. Similarly, there is a possibility that the liquid water that is produced during power generation is retained inside the cathode gas flow path in each cell 11 of the fuel cell 10. If the amount of this residing water (also referred to as a "cathode-side residing water" or "cathode-side liquid water") increases, the amount of water that moves to the anode side is thereby increased, thus easily leading to the generation of abnormal noise, etc., from the hydrogen circulation pump 64, and to a reduction in the cell voltage of the fuel cell 10.

Therefore, in the fuel cell system 100 of the present embodiment, the water discharge process for the anode gas circulation flow path (also referred to as "anode-side (forced) water discharge process") and the water discharge process for the cathode gas supply and discharge flow path (also referred to as "cathode side (forced) water discharge process"), both described below, are executed in order to suppress the generation of abnormal noise, and to suppress a reduction in the cell voltage of the fuel cell 10.

Figure 3:
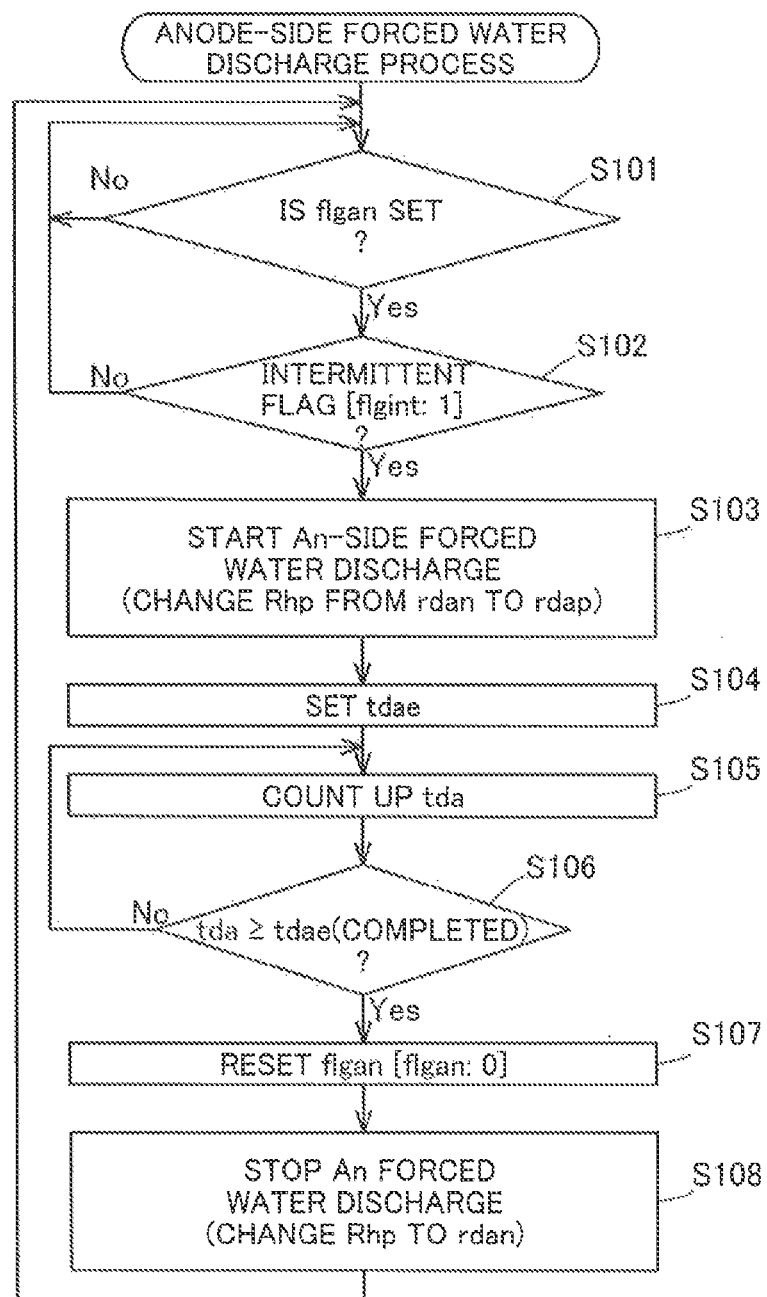
FIG. 3 is a flow chart showing the anode-side forced water discharge process that is executed during intermittent operation.

A2. Water Discharge Process for the Anode Gas Circulation Flow Path:

FIG. 3 is a flow chart showing the anode-side forced water discharge process that is executed during intermittent operation. The anode (abbreviated as "An")-side forced water discharge process is executed by the anode-side water discharge controller 21. The "intermittent operation" in the following description refers to the state in which the micropower intermittent operation described above is being performed.

In step S101, it is determined whether an anode forced water discharge flag flgan has been set or not. In step S102, it is determined whether or not the state of an intermittent flag flgint is set (flgint: 1), that is, whether or not intermittent operation is being performed. The setting of the An forced water discharge flag is executed by the HP (hydrogen circulation pump) residing water determination process described below. The intermittent flag figint is set in the controller 20.

If both the An forced water discharge flag flgan and the intermittent flag figint have been set. An-side forced water discharge is initiated in step S103. If the An-side forced water discharge is started, the rotational speed of the air compressor 32 (also referred to as the "ACP speed") is maintained at the value that has been set for the intermittent operation, and the rotational speed Rhp of the hydrogen circulation pump 64 (also referred to as the "HP speed") is raised from the low rotational speed rdan with which water discharge is not possible, which was set for the intermittent operation, to the rotational speed rdap with which water discharge is possible. Hereinafter, we refer to the rotational speed rdan of the hydrogen circulation pump 64 that was set for intermittent operation, and wherein water discharge is not possible, as the "An intermittent operation rotational speed rdan". The rotational speed rdap of the hydrogen circulation pump 64, wherein water discharge is possible, is referred to as the "An water discharge rotational speed rdap". The An water discharge rotational speed rdap is set, for example, to the lowest rotational speed rpa with which water discharge is possible (also referred to as "water dischargeable rotational speed threshold rpa"). This water dischargeable rotational speed threshold rpa is set, for example, to "rpa=1800 rpm". On the other hand, the An intermittent operation rotational speed rdan is a rotational speed that is below the water dischargeable rotational speed threshold rpa. While the An intermittent operation rotational speed rdan will vary depending on the circumstances of operation, it is set, for example, to a rotational speed of approximately 600 rpm. Incidentally, the rate of increase of the rotational speed in step S103 is at a low low-rate Kratd (ex.: 1800 rpm/4 sec), which is lower than a normal rate Kratt (ex.: 6000 rpm/sec) that is set for normal operation. The effect of setting the rate of increase to a low rate will be described later. The An water discharge rotational speed rdap that is use in An-side forced water discharge is not necessarily limited to the water dischargeable rotational speed threshold rpa, and it may be set to a higher speed. However, the higher the HP rotational speed Rhp is, the louder the operation sound (also referred to as the "drive sound") will be, so it is preferably set to as low a rotation as possible. If the HP rotational speed Rhp is set to the An water discharge rotational speed rdap, the residing water in the hydrogen circulation pump 64 is not only drained from the hydrogen circulation pump 64, the anode-side residing water (anode-side liquid water) that is retained in the anode gas circulation piping 63, and in the anode circulation flow path that is comprised of the anode gas supply piping 51 and the anodes of each cell of the fuel cell 10, is also drained through the gas-liquid separator 62.

In step S104, an anode water discharge completion time tdae is set in step S104. The An water discharge completion time tdae is the time required from when the HP rotational speed Rhp is at the An water discharge rotational speed rdap (or the water dischargeable rotational speed threshold rpa) until the amount of the residing water that fills the volume capacity Vp of the suction port 641 of the hydrogen circulation pump 64 (refer to FIG. 2) is completely drained. The An water discharge completion time tdae is set from a water discharge completion time map that is prepared in advance, and by obtaining an An water discharge completion time tdae that corresponds to the ambient temperature Tr of the hydrogen circulation pump 64 as measured by the temperature measuring unit 68.

Figure 4:
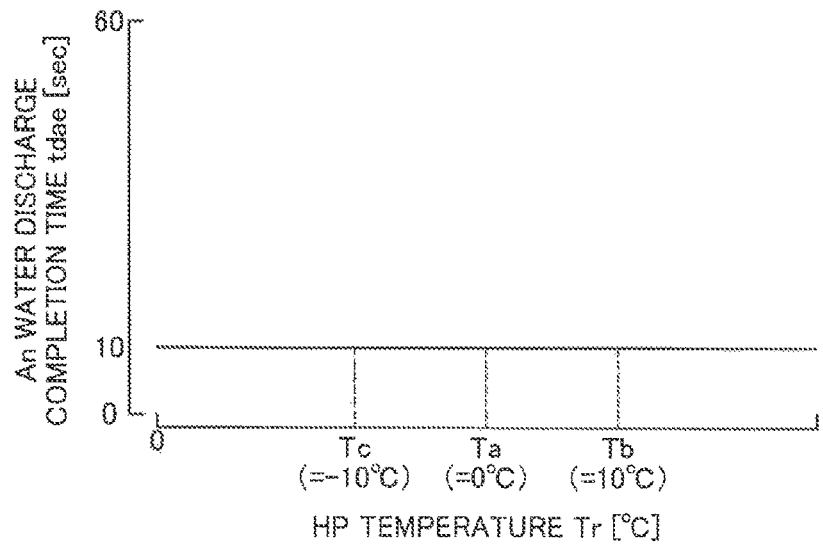
FIG. 4 is an explanatory diagram showing an example of the water discharge completion time map.

FIG. 4 is an explanatory diagram showing an example of the water discharge completion time map. The water discharge completion time map shows the relationship between the ambient temperature Tr (also referred to as the "IP temperature") of the hydrogen circulation pump 64 and the An water discharge completion time tdae. In this example, it is set to a constant value (10 sec) regardless of the temperature. The time required to drain the residing water from the hydrogen circulation pump 64 will decrease the higher the HP temperature is, and increase the lower the HP temperature is. Since water discharge is at least possible if set to a slow timeframe, in this example, it is set to a constant value. However, the value is not limited thereto, and it may be changed depending upon the HP temperature. Incidentally, the water discharge completion time map in FIG. 4 may be determined in advance through experimentation. Actually, the An water discharge completion time tdae may not be set to the actual time required to drain all of the residing water from the hydrogen circulation pump 64. In consideration of the trade-off between the time that is acceptable for the continuous sound of water discharge and the amount of residing water that may be reduced during that water discharge time, the An water discharge completion time tdae may be set to a time in which the amount of residing water may be reduced up to a certain level.

In step S105, an anode water discharge time tda that continues from when the HP rotational speed Rhp is set at the An water discharge rotational speed rdap is counted up in every unit time tu. The unit time tu is the basic time that indicates the operating cycle; for example, the time indicating the clock cycle that is the foundation of operation is used. The count-up of the An water discharge time tda is repeated until it is determined (in step S10) that the An water discharge time tda is greater than the An water discharge completion time tdae, in other words, until it is determined that the water discharge is completed.

If it is determined that the water discharge is completed, the An forced water discharge flag flgan is reset in step S107, and the HP rotational speed Rhp is returned to the An intermittent operation rotational speed rdan to stop the An-side forced water discharge process in step S108. Then the process returns to step S101, and waits until the An forced water discharge flag flgan is set.

Figure 5:
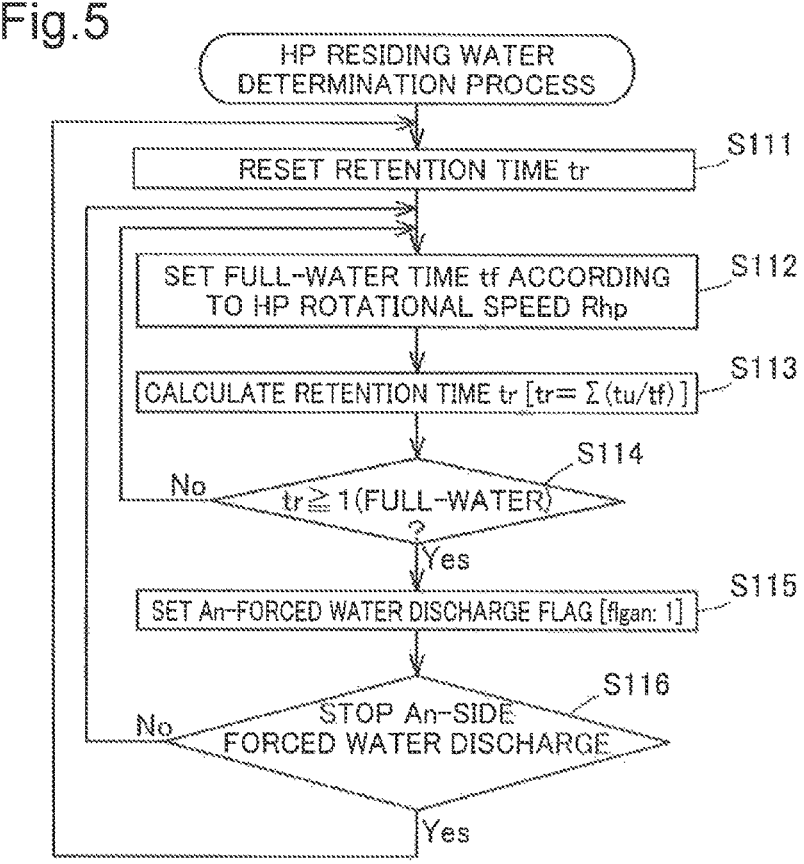
FIG. 5 is a flow chart showing the HIP residing water determination process.

FIG. 5 is a flow chart showing the HP residing water determination process. The HP residing water determination process is executed by the anode-side water discharge controller 21.

In step S111, a retention time Tr is reset. In step S112, a full-water time tf for the hydrogen circulation pump 64 that corresponds to the HP rotational speed Rhp is set. The full-water time tf is the time that is estimated, in relation to the HP rotational speed Rhp, for the residing water to accumulate in the suction port 641 for the hydrogen circulation pump 64 to fill its volume capacity Vp (see FIG. 2) and reach the full-water level. The full-water time tf is set by obtaining the full-water time tf that corresponds to the HP rotational speed Rhp in a default map that corresponds the ambient temperature of the hydrogen circulation pump 64 measured by the temperature measuring unit 68, wherein the default may is selected from pre-prepared maps for each ambient temperature Tr of the hydrogen circulation pump 64 (referred to as "full-water time maps").

Figure 6:
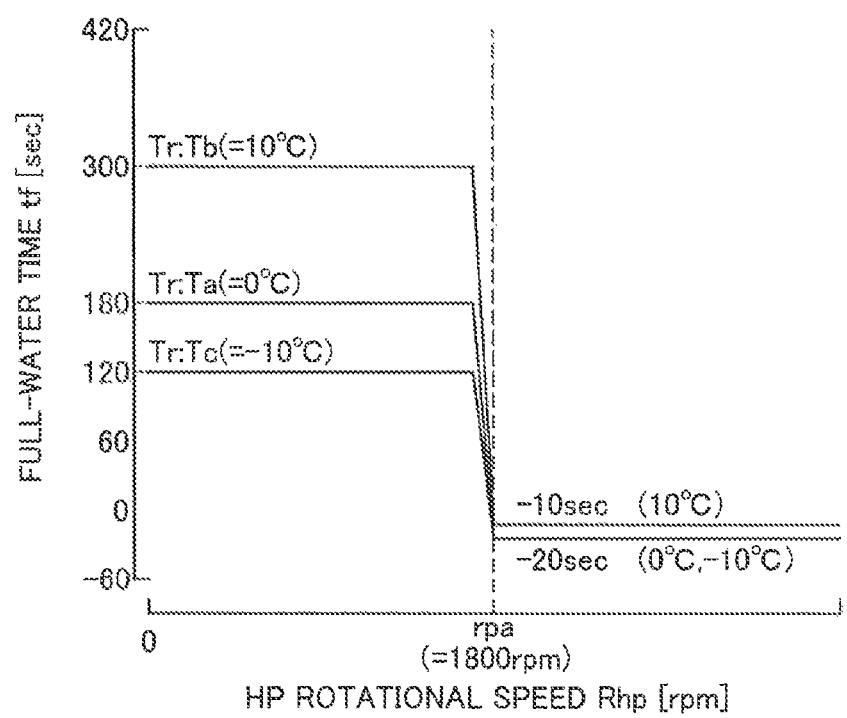
FIG. 6 is an explanatory diagram showing an example of a full-water time map.

FIG. 6 is an explanatory diagram showing an example of a full-water time map. The full-water time map shows the relationship between the HP rotational speed Rhp and the full-water time tf, and it is provided in regard to plural values of the ambient temperature Tr of the hydrogen circulation pump 64. The examples of Tr=Ta(=0° C.), Tr=Tb(=10° C.), and Tr=Tc(=−10° C.) are shown in FIG. 6.

The residing water in the hydrogen circulation pump 64 is drained when the water dischargeable rotational speed threshold rpa (=1800 rpm) is reached, whereas that liquid water is retained without being drained when the pump is below the water dischargeable rotational speed threshold rpa. Therefore, the full-water time tf is set to a positive value for rotational speeds that are lower than the water dischargeable rotational speed threshold rpa, and to a negative value (the value wherein the water discharge time is converted to the full-water time) for rotational speeds that are equal to or more than the water dischargeable rotational speed threshold rpa. The time for liquid water to accumulate and the time for liquid water to drain will differ depending on the temperature of the hydrogen circulation pump 64. To be specific, the higher the ambient temperature Tr of the hydrogen circulation pump 64 is, the more time it will take to reach the full-water level and the less time it will take for water discharge to be completed. Conversely, the lower the ambient temperature Tr of the hydrogen circulation pump 64 is, the less time it will take to reach the full-water level and the more time it will take for water discharge to be completed. In other words, the higher the ambient temperature Tr of the hydrogen circulation pump 64 is, the larger the positive value of the full-water time tf becomes for rotational speeds that are less than the water dischargeable rotational speed threshold rpa, and the smaller the absolute value of the negative full-water time tf becomes for rotational speeds that are equal to or more than the water dischargeable rotational speed threshold rpa. In contrast, the lower the ambient temperature Tr of the hydrogen circulation pump 64 is, the smaller the positive value of the full-water time tf becomes for rotational speeds that are less than the water dischargeable rotational speed threshold rpa, and the larger the absolute value of the negative full-water time tf becomes for rotational speeds that are equal to or more than the water dischargeable rotational speed threshold rpa.

In the example in FIG. 6, for the ambient temperature Tr of the hydrogen circulation pump 64 of Tb(=10° C.), the full-water time tf at a rotational speed of less than the water dischargeable rotational speed threshold rpa is set to 300 sec (5 min), and the full-water time tf at a rotational speed of equal to or more than the water dischargeable rotational speed threshold rpa is set to −10 sec. For the ambient temperature Tr of the hydrogen circulation pump 64 at Ta(=0° C.), the full-water time tf at a rotational speed of less than the water dischargeable rotational speed threshold rpa is set to 180 sec (3 min), and the full-water time tf at a rotational speed of equal to or more than the water dischargeable rotational speed threshold rpa is set to −20 sec. For the ambient temperature Tr of the hydrogen circulation pump 64 of Tc(=−10° C.), the full-water time tf at a rotational speed of less than the water dischargeable rotational speed threshold rpa is set to 120 sec (2 min), and the full-water time tf at a rotational speed of equal to or more than the water dischargeable rotational speed threshold rpa is set to −20 sec. In the case of an ambient temperature Tr for which a map is not prepared, any map may be used in which the upper and lower ambient temperature Tr are provided in accordance with predetermined rules. For example, when the ambient temperature is above the freezing point, a map for the lower temperatures may be used, and, when it is below the freezing point, a map for the upper temperatures may be used.

The full-water time map in FIG. 6 may be determined in advance through experimentation. For an HP rotational speed Rhp that is less than the water dischargeable rotational speed threshold rpa, it is possible to determine the full-water time and the estimated water discharge time by measuring the relationship between the time interval to perform water discharge and to generate biting noise, and the relationship between the time interval to perform water discharge and generate a drop in the cell voltage. For an HP rotational speed Rhp that is equal to or more than the water dischargeable rotational speed threshold rpa, it is satisfactory to measure the water discharge time at each speed.

In step S113 of FIG. 5, a retention time Tr (=Σ(tu/tf)) is obtained by accumulating the unit time tu divided by the full-water time tf. This retention time Tr corresponds to the amount of liquid water (residing water) that accumulates at the suction port 641 (see FIG. 2) of the hydrogen circulation pump 64.

The setting of the full-water time tf in step 112 and the calculation of the retention time Tr in step S113 are repeated until the retention time Tr is 1 or more, i.e., the suction port 641 of the hydrogen circulation pump 64 is determined to be at the full-water level (step S114).

If the suction port 611 of the hydrogen circulation pump 64 is determined to be at the full-water level, the An forced water discharge flag flgan (flgan: 1) is set in step S115. Then, step S113 to step S115 are repeated until the An-side forced water discharge is determined to have been completed in step S116. Once the An-side forced water discharge is determined to have been completed, the process from Step S111 is repeated. The completion of the An-side forced water discharge is detected when the HP rotational speed Rhp is changed from the An water discharge rotational speed rdap (or water dischargeable rotational speed threshold rpa) to the An intermittent operation rotational speed rdan in step S108 of FIG. 3.

By having the anode-side water discharge controller 21 execute the process in FIG. 3 and the process in FIG. 5, the An-side forced water discharge is repeatedly executed each time the suction port 641 of the hydrogen circulation pump 64 is determined to be at the full-water level during the intermittent operation.

Figure 7:
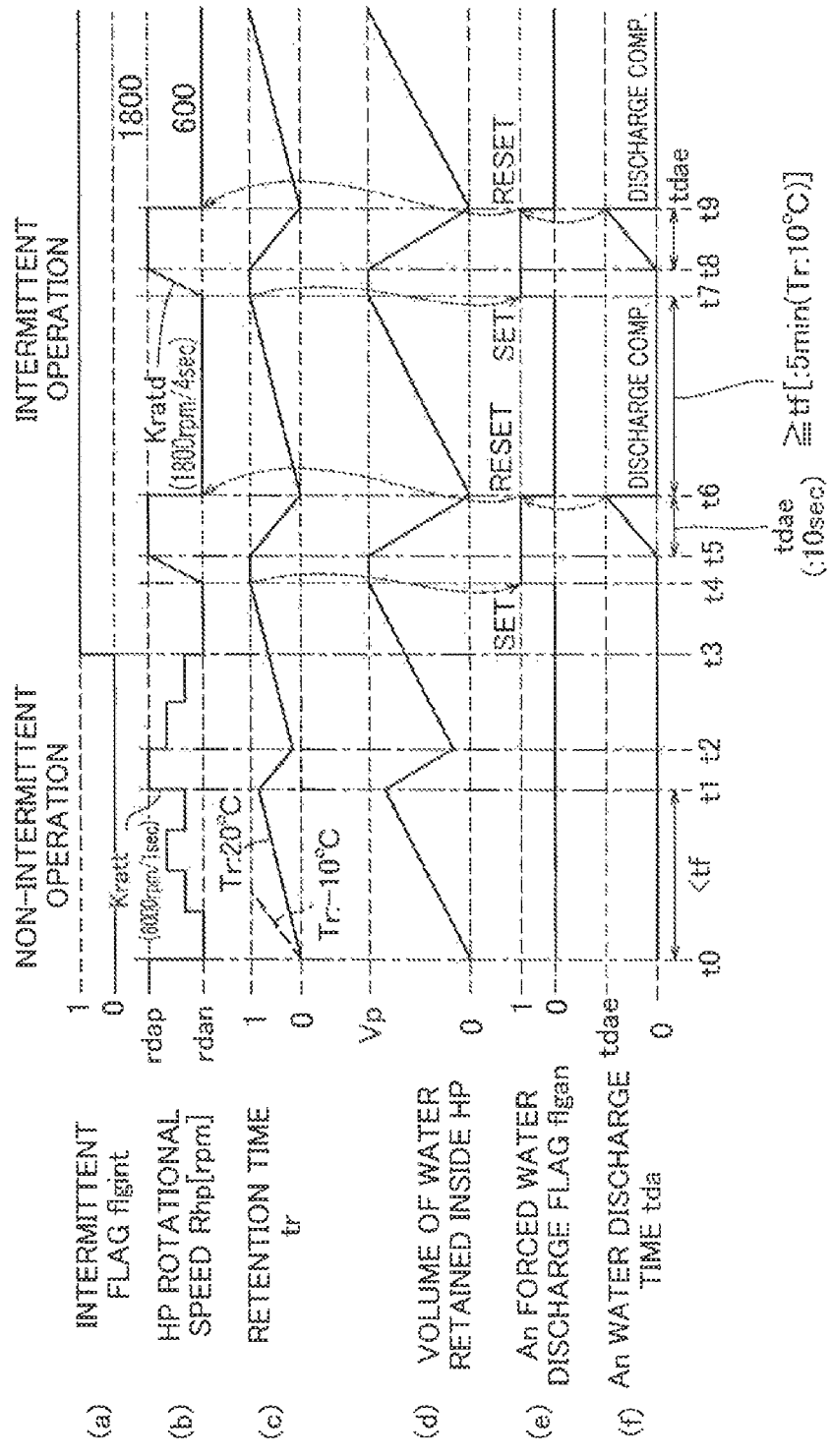
FIG. 7 is a time chart showing a specific example of the anode-side forced water discharge process.

FIG. 7 is a time chart showing a specific example of the anode-side forced water discharge process. FIG. 7(a) shows the intermittent flag flgint, FIG. 7(b) shows the HP rotational speed Rhp, FIG. 7(c) shows the retention time Tr, FIG. 7(d) shows the amount of water retained inside the HP (amount of residing water in the hydrogen circulation pump 64), FIG. 7(e) shows the An forced water discharge flag flgan, and FIG. 7(f) shows the An water discharge time tda. Let us assume that, at the start timing of time t0, the HP rotational speed Rhp changes from the An water discharge rotational speed rdap to the An intermittent operation rotational speed rdan (non-water-dischargeable rotational speed), the retention time Tr is 0, the amount of water that has accumulated inside the HP is 0, the An forced water discharge flag flgan is 0, and the An water discharge time tda is 0. Also assume that, prior to time t3, the intermittent flag flgint is 0, i.e., it is a state of non-intermittent operation in which the intermittent operation is not being performed and, after time t3, that the intermittent flag figint is 1, i.e., it is during the intermittent operation (during the micropower intermittent operation). Let us further assume that the An water discharge rotational speed rdap during the intermittent operation is equal to the water dischargeable rotational speed threshold rpa (=1.800 rpm). The An intermittent operation rotational speed rdan will actually vary depending on the operating conditions, but in this example, for ease of explanation, let us assume that it is a constant (600 rpm). Moreover, the actual HP rotational speed Rhp during non-intermittent operation changes according to the position of the accelerator pedal, but, for ease of explanation, let us assume that it varies between the An intermittent operation rotational speed rdan (=600 rpm) and the An water discharge rotational speed rdap (=1800 rpm).

Since the HP rotational speed Rhp changes between time t0 and time t1 but maintains less than the An water discharge rotational speed rdap with which water discharge is possible as shown in FIG. 7(b), the retention time Tr increases according to the set positive full-water time tf (see FIG. 6) as shown in FIG. 7(c). This rate of increase falls the higher the HP temperature Tr (the ambient temperature of the hydrogen circulation pump 64) is, and rises the lower the temperature is. The solid line shows an example when the HP temperature Tr is 20° C. and the broken line represents an example when the HP temperature Tr is −10° C. Here, the interval from time t0 to time t1 is shorter than the full-water time tf. Therefore, the retention time Tr at time t1 is less than 1 and, as shown in FIG. 7 (d), it is estimated that the residing water in the HP has not reached the full-water volume Vp.

As shown in FIG. 7 (b), the IP rotational speed Rhp is set at the An water discharge rotational speed rdap between time t1 and time t2. During this period, the retention time Tr decreases according to the set negative full-water time tf (see FIG. 6) as shown in FIG. 7(c). This rate of decrease falls the higher the HP temperature Tr is, and rises the lower the temperature is. Here, the interval from time t1 to time t2 is short, and it is not possible to drain all of the residing water at time t1, so it is estimated that the amount of residing water in the HP will not decreased to 0 as shown in FIG. 7(d).

Thus, since the retention time Tr may be regarded as equivalent to the ratio of the amount of residing water vis-à-vis the full-water volume Vp, the amount of residing water in the HP may be estimated by that retention time Tr. For example, the amount of residing water in the HP may be estimated to be the amount that is indicated by the product of the retention time Tr and the full-water volume Vp, in other words, (tr·Vp).

Next, as shown in FIG. 7(b), the HP rotational speed Rhp decreases in multi steps from the An water discharge rotational speed rdap to the An intermittent operation rotational speed rdan between time t2 and time t4. During this period, the retention time Tr increases according to the set positive full-water time tf, just as it does from time t0 to time t1, as shown in FIG. 7(c). Then, at time t4, when tr≥1, it is estimated that the amount of residing water in the HP will be the full-water level as shown in FIG. 7(d). Since the full-water level is reached early by the amount of water retained at time t2, the interval between time t2 and time t4 is less than the set full-water time tf. At time t4, the An forced water discharge flag flgan is set as shown in FIG. 7(e), and the An-side forced water discharge is started in step S103 of FIG. 3 because the intermittent flag flgint has been set to 1 at time t3. Thus, as shown in FIG. 7(b), the HP rotational speed Rhp increases from the An intermittent operation rotational speed rdan to the An water discharge rotational speed rdap. However, as described above, the HP rotational speed Rhp rises slowly at the low rate Kratd (1800 rpm/4 sec) between time t4 and time t5. It is thus possible to suppressing the generation of biting in the hydrogen circulation pump 64 by slowly increasing the HP rotational speed Rhp in this way when starting the water discharge of the residing water. Moreover, since the HP rotational speed Rhp is increased slowly while limiting it to the low rate Kratd, even if biting noise occurs, it is possible to suppress the generation of abnormal noise and the like.

Once water discharge is started when the HP rotational speed Rhp reaches the An water discharge rotational speed rdap at time t5 as shown in FIG. 7(b), the retention time Tr falls in accordance with the set negative full-water time tf (see FIG. 6), in the same way as it does from time t1 to time t2, as shown in FIG. 7(c) The An water discharge time tda is also counted up, as shown in FIG. 7(f). Once the An water discharge time tda reaches the set An water discharge completion time tdae at time t6, it is presumed that water discharge has been completed and, as shown in FIG. 7(e), the An forced water discharge flag flgan is reset and the HP rotational speed Rhp is returned from the An water discharge rotational speed rdap to the An intermittent operation rotational speed rdan, as shown in FIG. 7(b).

Thereafter, during the intermittent operation, the same process as that during the period from time t2 to time t6 is performed repeatedly, and, each time the retention time Tr becomes 1 or more, that is, the period with the An intermittent operation rotational speed rdan becomes larger than the positive full-water time tf, the amount of residing water in the HP is presumed to be at the full-water level, and the anode-side forced water discharge process is repeated. FIG. 7 shows an example of the full-water time tf at 5 min=300 sec (see FIG. 6) when the HP temperature Tr is 10° C.

As described above, in the present embodiment, the amount of residing water in the HP is estimated during the intermittent operation (during the micropower intermittent operation) and, if the amount of residing water in the HP has reached a predetermined value (in this example, the suction port 641 of the hydrogen circulation pump 64 is determined to have reached the full-water level), the anode forced water discharge process is executed, and the anode-side liquid water contained in the anode gas circulation flow path is drained. Consequently, it is possible to suppress the generation of abnormal noise that occurs when a large quantity of water has accumulated in the hydrogen circulation pump 64, while also preventing a voltage drop in the fuel cell 10 due to insufficient gas when high-load operation is started after the intermittent operation has been stopped in a state where there is an increased amount of residing water in the anode of the cell 11 of the fuel cell 10.

Figure 8:
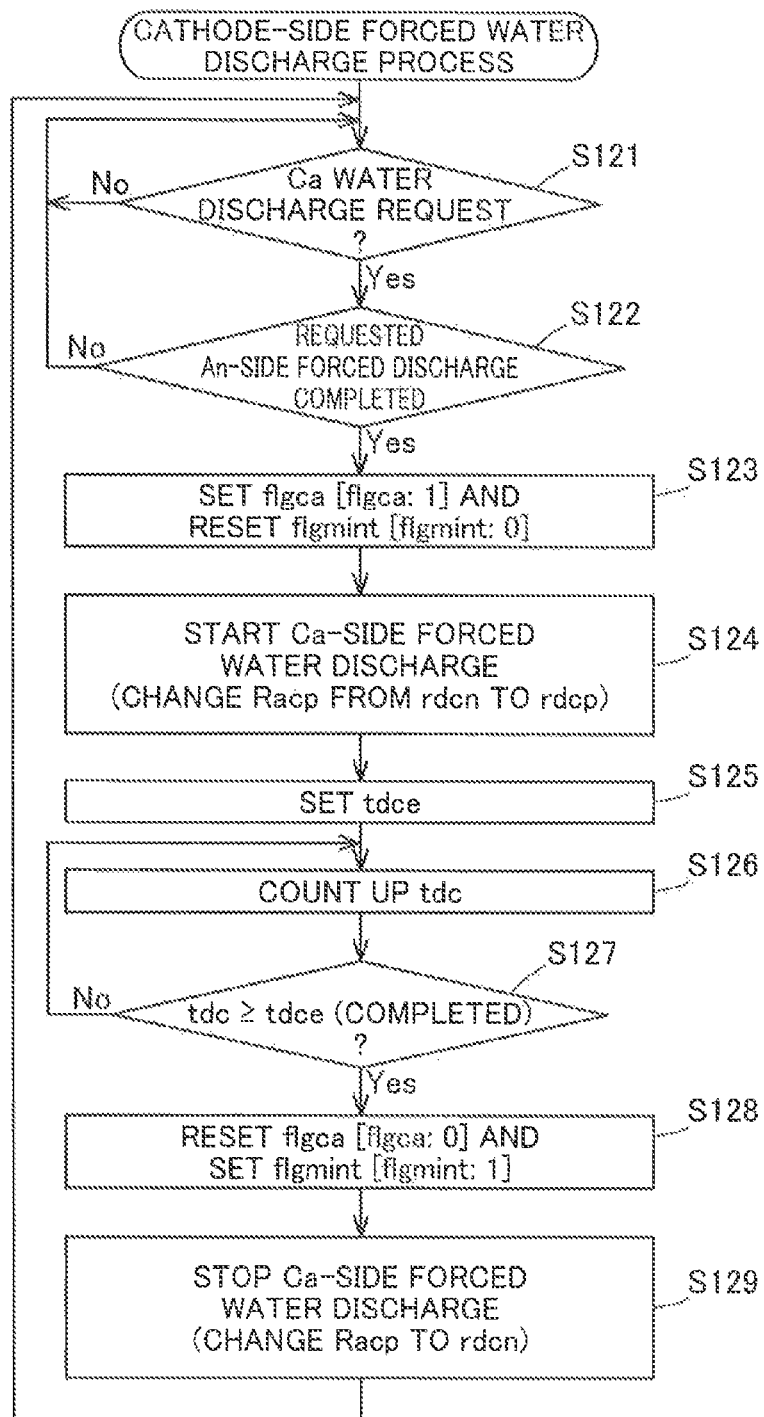
FIG. 8 is a flow chart showing the cathode-side forced water discharge process that is executed (luring intermittent operation.

A3. Water Discharge Process for the Cathode Gas Supply and Discharge Flow Path:

FIG. 8 is a flow chart showing the cathode-side forced water discharge process that is executed during the intermittent operation (during the micropower generation intermittent operation). The cathode (also referred to as "Ca") forced water discharge process is executed by the cathode-side water discharge controller 23.

In step S121, it is determined whether or not there is a Ca water discharge request. In step S122, it is determined whether or not An-side forced water discharge has been started and completed. The Ca water discharge request is generated by a Ca water discharge request determination process, which will be described later, the start and completion of the An-side forced water discharge is detected by an An-side forced water discharge determination process, which will also be described later.

When there is a Ca water discharge request and An-side forced water discharge has been started and completed, then a Ca forced water discharge flag flgca is set and an intermittent operation flag figmint is reset in step S123, and the Ca-side forced water discharge is started in step S124. The intermittent operation flag flgmint is prepared as a separate flag from the intermittent flag figint that is used in FIG. 3 (step S102), and the intermittent operation flag flgmint is set in accordance with the setting of the intermittent flag flgint. It is this intermittent operation flag flgmint that is reset in step S123. If the Ca-side forced water discharge has been started, a rotational speed Racp of the air compressor 32 (also referred to as the "ACP rotational speed Racp") rises from a rotational speed rdcn during the intermittent operation (also referred to as the "Ca intermittent operation rotational speed rdcn") to a water dischargeable rotational speed rdcp (also referred to as the "Ca water discharge rotational speed rdcp"). Though the Ca intermittent operation rotational speed rdcn will vary depending on the circumstances of operation, it may be set, for example, to a rotational speed of about 600 rpm. The Ca water discharge rotational speed will also vary depending on the circumstances of operation but it may be set to a rotational speed less than the An water discharge rotational speed rdap (or the water dischargeable rotational speed threshold rpa, for example, 1800 rpm) of the HP rotational speed Rhp during the An-side forced water discharge, for example, to a rotational speed of approximately 1400 rpm. At this time, power generation is performed using the cathode gas that is supplied according to the ACP rotational speed Racp in the fuel cell 10, and in order to produce a rotational speed that is sufficient to supply the anode gas in accordance with that level of power generation, the HP rotational speed Rhp is lowered from the An water discharge rotational speed rdap to a rotational speed that is equivalent to the Ca water discharge rotational speed rdcp. Once the ACP rotational speed Racp is set to the Ca water discharge rotational speed rdcp, the cathode-side residual gas that is contained in the cathode gas supply and discharge flow path, which is composed of the cathode gas supply piping 31, the cathode exhaust gas piping 41, and the cathodes of each cell of the fuel cell 10, is discharged to the outside through the cathode exhaust gas piping 41.

In step S125, a Ca water discharge completion time tdce is set. The Ca water discharge completion time tdce is the time required for water discharge from a state where the residing water in the cathode gas supply and discharge flow path, in particular in each cell 11 of the fuel cell 10, has reached an upper threshold (describe later) of an acceptable water amount during power generation down to a state with a predetermined reference water amount during power generation while the ACP rotational speed Racp being at the Ca water discharge rotational speed rdcp. The Ca water discharge completion time tdce is set to a predetermined constant value (for example, 20 sec). This value may be determined in advance by experiments.

In step S126, a Ca water discharge time tdc, which is the continuous time period from when the ACP rotational speed Racp is set at the Ca water discharge rotational speed rdcp, is counted up (added) in every unit time tu. The count-up of the Ca water discharge time tdc is repeated until it is presumed (step S127) that the Ca water discharge time tdc is equal to or more than the Ca water discharge completion time tdce, i.e., until it is presumed that water discharge has been completed.

If it is determined that water discharge has been completed, the Ca forced water discharge flag flgca is reset and the intermittent, operation flag flgmint is set in step S128. In step S129, the ACP rotational speed Racp is returned to the Ca intermittent operation rotational speed rdcn, and Ca-side forced water discharge is completed. The process then returns to step S121 and waits for another Ca water discharge request.

Figure 9:
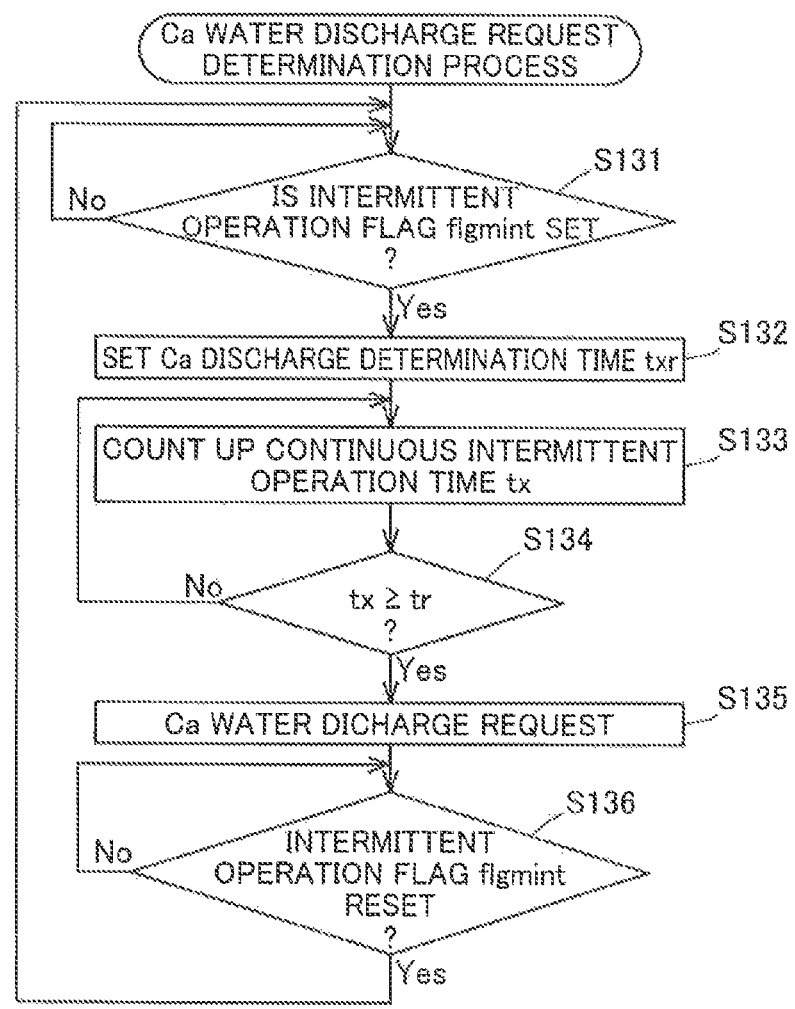
FIG. 9 is a flow chart showing the cathode water discharge request determination process.

FIG. 9 is a flow chart showing the cathode water discharge request determination process. The Ca water discharge request determination process is executed by the cathode water discharge controller 23. In step S131, the process waits until the intermittent operation flag flgmint is set in accordance with the setting of the intermittent flag flgint. The intermittent operation flag flgmint is set in the controller 20.

In step S132, a Ca water discharge determination time txr is set. The Ca water discharge determination time txr is the estimated time, during the intermittent operation, for residing water in the cathode gas supply and discharge flow path, in particular in each cell 11 of the fuel cell 10, to reach a predetermined upper threshold of an acceptable water amount during power generation. The Ca water discharge determination time txr is set to a predetermined constant value. For example, if the interval txr0 required for Ca-side forced water discharge is 30 min, the Ca water discharge determination time txr is set to 25 min in consideration of a maximum value for the An-side forced water discharge interval (full-water time tf) being 5 min (see FIG. 6).

In step S133, the continuous intermittent operation time tx, which is the continuous time period from when the intermittent operation flag flgmint is set, is counted up (added) in every unit time tu. The count-up of the continuous intermittent operation time tx is repeated until the continuous intermittent operation time tx becomes equal to or more than the Ca water discharge determination time txr (step S134), i.e., until it is determined that water has accumulated in the cathode gas supply and discharge flow path and water discharge is necessary.

If it is determined that Ca water discharge is necessary in step S134, a Ca water discharge request is issued in step S135. Then, in step S136, the process waits until the intermittent operation flag flgmint is reset. As described before, the resetting of the intermittent operation flag flgmint is executed by the controller 20 when it is determined that there is a Ca water discharge request in step S121 of FIG. 8 and that the An-side forced water discharge has been started and completed in step S122; thus, the Ca-side forced water discharge is started in step S123 accordingly.

The Ca water discharge request corresponds to the "cathode-side water discharge request" in the claimed invention. Also, the timing when the continuous intermittent operation time tx becomes equal to or more than the Ca water discharge determination time txr and thus a Ca water discharge is determined to be necessary corresponds to the "predetermined timing" of the claimed invention.

Figure 10:
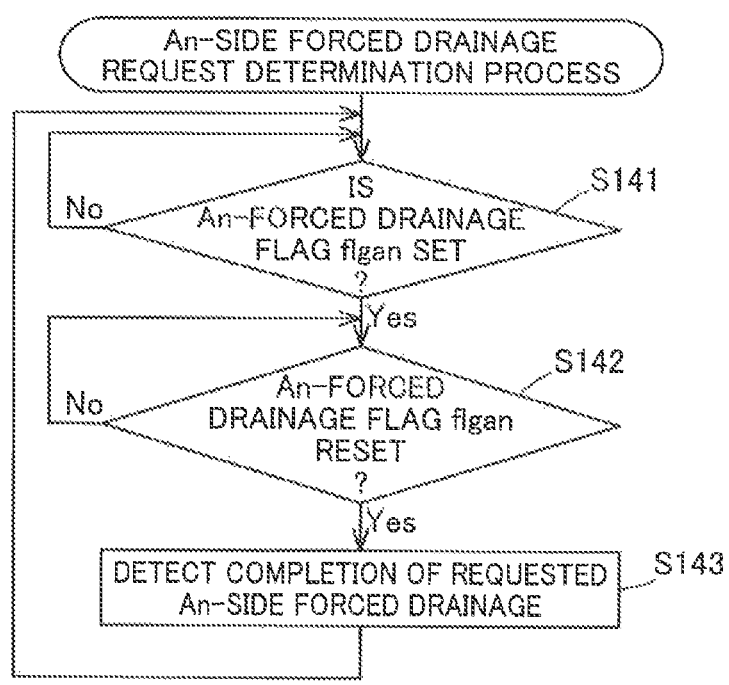
FIG. 10 is a flow chart showing the anode-side forced water discharge determination process.

FIG. 10 is a flow chart showing an An-side forced water discharge determination process. The anode-side forced water discharge determination process is executed by the An-side water discharge detector 22.

In step S141, the process waits until the An forced water discharge flag flgan is set. After the An forced water discharge flag flgan is set, the process waits until the An forced water discharge flag flgan is reset in step S142. Upon resetting of the An forced water discharge flag flgan, it is detected that the An-side forced water discharge has been started and completed in step S143, and the process returns to step S141 and waits until the An forced water discharge flag flgan is set.

FIG. 11 is a time chart showing a specific example of the cathode-side forced water discharge process. FIG. 11(*a*) shows the intermittent operation flag flgmint, FIG. 11(*b*) shows the Ca water discharge request, FIG. 11(*c*) shows the An forced water discharge flag flgan. FIG. 11(*d*) shows the Ca forced water discharge flag flgca, FIG. 11(*e*) shows the HP rotational speed Rhp, FIG. 11(*f*) shows the ACP rotational speed Racp and FIG. 11(*g*) shows the Ca water discharge time tdc. At time t10, which is the start timing, the intermittent operation flag flgmint is set according to the setting of the intermittent flag flgint (not shown).

As shown in FIG. 11(*b*), a Ca water discharge request is generated (step S135 of FIG. 9) at time t1 when the continuous intermittent operation time tx after the intermittent operation flag flgmint is set at time t10 becomes equal to or more than the Ca water discharge determination time txr. After generation of the Ca water discharge request, as shown in FIG. 11(*c*), once the An forced water discharge flag flgan is set at time t12 (flgan: 1), the HP rotational speed Rhp increases up to the An water discharge rotational speed rdap as shown in FIG. 11(*e*) so that the An-side forced water discharge is performed. Then, as shown in FIG. 11(*c*), once the An forced water discharge flag flgan is reset at time t13 (flgan: 0), the HP rotational speed Rhp is returned to the An intermittent operation rotational speed rdan as shown in FIG. 11(*e*), and the Ca forced water discharge flag flgca is set (flgca: 1) as shown in FIG. 11(*d*). This example shows the case where, after the generation of the Ca water discharge request, the An forced water discharge flag flgan is set and An forced water discharge is started, and then, once the An forced water discharge flag flgan is reset and An forced water discharge is completed, it is detected that the An-side forced water discharge is started and completed (step S134 of FIG. 10), and then the Ca forced water discharge flag flgca is set. However, there are some cases where An forced water discharge has been already started when a Ca water discharge request is generated. In that case, since the An forced water discharge flag flgan is already set, it is detected that the An-side forced water discharge is started and completed (step S134 of FIG. 10) upon resetting of the An forced water discharge flag flgan, and then the Ca forced water discharge flag flgca is set.

Once the Ca forced water discharge flag flgca is set at time t13, the intermittent operation flag flgmint is temporarily reset (flgmint: 0) accordingly as shown in FIG. 11(*a*), the ACP rotational speed Racp rises to the Ca water discharge rotational speed rdcp as shown in FIG. 11(*f*), and Ca-side forced water discharge is started. The Ca water discharge time tdc is then counted up as shown in FIG. 11(*g*). Once the Ca water discharge time tdc reaches the Ca water discharge completion time tdce at time t14, it is determined that water discharge has been completed and the Ca forced water discharge flag flgca is reset (flgca: 0) as shown in FIG. 11(*d*). Once the Ca forced water discharge flag flgca is reset, the ACP rotational speed Racp is returned to the Ca intermittent operation rotational speed rdcn in accordance with that as shown in FIG. 11(*f*), the intermittent operation flag flgmint is set as shown in FIG. 11(*a*), and the intermittent operation is resumed.

As described above, in this embodiment, during the intermittent operation (during the micropower intermittent operation) and during the Ca water discharge determination time txr, the state is continued in which there is no water discharge of cathode-side residing water from the cathode gas supply and discharge flow path (in particular, from the cathode gas flow path in the fuel cell 10). If a Ca water discharge request is generated, first the anode forced water discharge process is started and, after it is completed, the requested cathode-side forced water discharge process is performed. As a result, it is possible to perform water discharge of the cathode-side liquid water contained in the cathode gas supply and discharge flow path.

With the anode-side forced water discharge, the HP rotational speed Rhp of the hydrogen circulation pump 64 is set to the An water discharge rotational speed rdap, and the ACP rotational speed Racp of the air compressor (ACP) 32 is set to the Ca intermittent operation rotational speed rdcn. On the other hand, with the cathode-side forced water discharge, the ACP rotational speed Racp is set to the Ca water discharge rotational speed rdcp (rdcn<rdcp<rdap), the HP rotational speed Rhp is lower than the An water discharge rotational speed rdap and, in this example, is the same rotational speed as the Ca water discharge rpm rdcp. As a result, the operation sound (drive sound) during the anode-side forced water discharge is louder than that of the operation sound during the cathode-side forced water discharge.

If, contrary to the present embodiment, the anode-side forced water discharge is performed after execution of the cathode-side forced water discharge, the operation sound of the air compressor 32 will change from louder to quieter while the operation sound of the hydrogen circulation pump 64 will go from quieter to louder. Thus, only the operation sound of the hydrogen circulation pump 64 will continue, and there may cause the user to have a sense of discomfort or a sense of incompatibility, anxiety for faults and the like.

In this embodiment, since the cathode-side forced water discharge process with the smaller operation sound is performed after the anode-side forced water discharge process with louder operation sound, it gives the user the impression that the generated operation sound is becoming quieter. Therefore, as compared with the case of the water discharge process performed in reverse which would give the impression that the sound is increasing, it is possible to reduce a sense of discomfort or a sense of incompatibility, anxiety for faults and the like.

B. Modification Examples (1) Modification Example 1

With the embodiment above, the fuel cell 10 is a so-called "counter-flow" type. However, this invention is not limited to that type, and a so-called "co-flow" type or so-called "cross-flow" type fuel cell may be employed.

(2) Modification Example 2

With the embodiments above, the controller 20 is a microcomputer and described as having a configuration that is able, by running the software that corresponds to a variety of controls, is able to carry out the functions of the overall controller, the cathode gas controller that controls the cathode gas supply system 30 and the cathode gas discharge system 40, the anode gas controller that controls the anode gas supply system 50 and the anode gas circulation system 60, the coolant controller that controls the coolant circulation system 70, the anode-side water discharge controller 21, the anode-side water discharge detector 22 and the cathode-side water discharge controller 23. However, the controller 20 may also be realized through the hardware configuration of each controller using dedicated processing circuitry.

(3) Modification Example 3

With the embodiment above, the retention time Tr, which corresponds to the ratio of the amount of residing water vis-à-vis the full-water volume at the suction port 641 of the hydrogen circulation pump 64, is employed. When that retention time Tr becomes 1 or more, the amount of residing water is determined to be at the full-water level and the anode-side forced water discharge process is executed. However, the present invention is not limited thereto, and it is also possible to execute anode-side forced water discharge process upon the determination of the full-water level by calculating the residing water in accordance with the circulation flow rate history (time changes) with the non-water-dischargeable rotational speed (An intermittent operation rotational speed).

(4) Modification Example 4

With the embodiments above, although the anode-side forced water discharge process is executed when the suction port 641 of the hydrogen circulation pump 64 is determined to be at the full-water level, the present invention is not limited thereto, and it is also possible to have the anode-side forced water discharge process executed when it is determined that a predetermined amount of liquid water has accumulated at the suction port 641.

(5) Modification Example 5

With the embodiment above, although the rate of increase of the rotational speed of the hydrogen circulation pump 64 is limited to the low rate, it is possible to increase the rotational speed in multiple steps using a plurality of limited rotational speed values. In other words, it is preferable to limit the rate of increase of the rotational speed of the hydrogen circulation pump 64.

(6) Modification Example 6

With the embodiment above, it has been described that the full-water time map is selected based on the ambient temperature Tr of the hydrogen circulation pump 64 as measured by the temperature measuring unit 68. However, it is possible to measure the outside air temperature and use that measured outside air temperature in place of the ambient temperature Tr of the hydrogen circulation pump 64. The temperature used when selecting the map may be a temperature that is usable as the temperature of the hydrogen circulation pump 64.

(7) Modification Example 7

With the embodiment above, examples are described in which the water discharge of the anode side is executed upon a change in the rotational speed of the hydrogen circulation pump 64, and the water discharge of the cathode side is executed by changing the rotational speed of the air compressor 32. However, the present invention is not limited thereto, and other types of anode gas pumps with which the circulation flow rate (flow velocity) of the anode gas circulation system 60 is adjustable may be used in place of the hydrogen circulation pump 64. Similarly, it is possible to use other types of cathode gas pumps with which the supply and discharge flow rate (flow velocity) of the cathode gas supply system 30 and the cathode gas discharge system 40 is adjustable in place of the air compressor 32.

(8) Modification Example 8

With the embodiment above, it is assumed that the operation sound of the hydrogen circulation pump 64 during the anode-side forced water discharge is louder than the operation sound of both the hydrogen circulation pump 64 and the air compressor 32 during the cathode-side forced water discharge, and therefore the operation sound during the anode-side forced water discharge is louder than the operation sound during the cathode-side forced water discharge. Further the above embodiment is also described wherein the anode-side forced water discharge using the hydrogen circulation pump 64 is pre-selected as the operation that is to be executed first, and after execution of the anode-side forced water discharge with the louder operation sound, then the cathode-side forced water discharge with a quieter operation sound is executed.

However, there may be cases where the operation sound of the air compressor 32 during the cathode-side forced water discharge is louder than the operation sound of both the air compressor 32 and the hydrogen circulation pump 64 during the anode-side forced water discharge, and therefore the operation sound of the cathode-side forced water discharge is louder than the anode side-forced water discharge. Moreover, there may be still other cases where the operation sound of the hydrogen circulation pump 64 during the cathode-side forced water discharge is louder than the operation sound of the hydrogen circulation pump 64 during the anode-side forced water discharge, and therefore the operation sound of the cathode-side forced water discharge is louder than the anode-side forced water discharge. In these cases, it is also possible to pre-select the cathode-side forced water discharge using the air compressor 32 as the operation that is to be executed first, and after execution of the cathode-side forced water discharge with the louder operation sound, then the anode-side forced water discharge with a quieter operation sound is executed.

In a case where the cathode-side forced water discharge is to be executed first, when the water discharge of the cathode-side liquid water has already started upon generation of the anode-side water discharge request, the anode-side water discharge controller 21 may execute the anode-side liquid water discharge after the cathode-side liquid water discharge is completed. On the other hand, when the water discharge of the cathode-side liquid water has not started yet, it is possible to have the water discharge of cathode-side liquid water started, and the requested anode-side liquid water discharge may be performed after the cathode-side liquid water discharge is completed.

The present invention is not limited to the embodiments and modification examples described above, and the realization of various constitutions is possible in a range that does not depart from the gist of the invention. For example, it is possible for the technical features in the embodiments and modification examples that correspond to the technical features in each of the modes according to the Summary section to be replaced or combined as appropriate in order to solve a portion or all of the problems described above, or in order to achieve a portion of all of the effects described above. Also, where a technical feature is not described as one that is essential in the present specifications, it may be removed as appropriate.

What is claimed is:

1. A fuel cell system comprising:
   a fuel cell;
   an anode gas supply flow path that supplies anode gas to the fuel cell;
   an anode gas discharge flow path that discharges anode off-gas from the fuel cell;
   an anode gas circulation flow path that connects the anode gas supply flow path and the anode gas discharge flow path;
   an anode gas pump that is installed in the anode gas circulation flow path, and that supplies the anode off-gas to the anode gas supply flow path;
   an anode-side water discharge controller that controls a circulation flow rate of the anode gas pump so as to discharge anode-side liquid water residing in the anode-side flow path;
   a cathode gas supply flow path that supplies cathode gas to the fuel cell;
   a cathode gas pump that is installed in the cathode gas supply flow path, and that supplies the cathode gas to the fuel cell; and
   a cathode-side water discharge controller that controls a supply flow rate of the cathode gas pump so as to discharge cathode-side liquid water residing in the cathode-side flow path,
   wherein the anode-side water discharge controller and the cathode-side water discharge controller are configured to execute water discharge by running a pre-selected one of the anode gas pump and the cathode gas pump, and then running the other of the anode gas pump and the cathode gas pump,
   wherein the anode gas pump is a pump that is configured to change a circulation flow rate of the anode gas through rotation of the anode gas pump, and
   wherein the anode-side water discharge controller is configured to execute the water discharge by increasing a rotational speed of the anode gas pump with a rate of increase of rotational speed lower than a normal rate of increase of rotational speed that is set for normal power generation operation.

2. The fuel cell system according to claim 1, wherein, when a cathode-side water discharge request is generated, the cathode-side water discharge controller performs control such that:
   (a) if the anode-side water discharge controller has already started discharge of the anode-side liquid water, then the cathode-side water discharge controller executes discharge of the cathode-side liquid water after the discharge of the anode-side liquid water is completed; and
   (b) if the anode-side water discharge controller has not yet started discharge of the anode-side liquid water, then the cathode-side water discharge controller executes discharge of the cathode-side liquid water after discharge of the anode-side liquid water is started and completed by the anode-side water discharge controller.

3. The fuel cell system according to claim 1, wherein the anode-side water discharge controller is configured to estimate an amount of residing water that resides in the anode gas pump based on the circulation flow rate of the anode gas pump, and executes discharge of the anode liquid water when the amount of the residing water is equal to or greater than a predetermined value.

4. The fuel cell system according to claim 3, wherein the anode-side water discharge controller is configured to estimate the amount of residing water that resides in the anode gas pump based on the circulation flow rate of the anode gas pump with reference to pre-prepared relationship between the circulation flow rate of the anode gas pump and the amount of residing water that resides in the anode gas pump.

5. The fuel cell system according to claim 1, wherein the cathode gas pump is a compressor that changes the supply flow rate of the cathode gas through its rotation.

6. A method of controlling a fuel cell system comprising a fuel cell, an anode gas supply flow path that supplies anode gas to the fuel cell, an anode gas discharge flow path that discharges anode off-gas from the fuel cell, an anode gas circulation flow path that connects the anode gas supply flow path and the anode gas discharge flow path, an anode gas pump that is installed in the anode gas circulation flow path and that supplies the anode off-gas to the anode gas supply flow path, a cathode gas supply flow path that supplies cathode gas to the fuel cell, and a cathode gas pump that is installed in the cathode gas supply flow path and that supplies the cathode gas to the fuel cell, the anode gas pump is a pump that is configured to change a circulation flow rate of the anode gas through rotation of the anode gas pump, the method comprising:

executing water discharge by running a pre-selected one of the anode gas pump and the cathode gas pump, and then running the other of the anode gas pump and the cathode gas pump; and executing the water discharge by increasing a rotational speed of the anode gas pump with a rate of increase of rotational speed lower than a normal rate of increase of rotational speed that is set for normal power generation operation.

7. The method according to claim 6, wherein, when a cathode-side water discharge request is generated,
(a) if discharge of the anode-side liquid water has already started, then executing discharge of the cathode-side liquid water after the discharge of the anode-side liquid water is completed; and
(b) if discharge of the anode-side liquid water has not yet started, then executing discharge of the cathode-side liquid water after discharge of the anode-side liquid water is started and completed.

8. The method according to claim 6, further comprising:
estimating an amount of residing water that resides in the anode gas pump based on the circulation flow rate of the anode gas pump, and executing discharge of the anode liquid water when the amount of the residing water is equal to or greater than a predetermined value.

9. The method according to claim 8, wherein
the estimating the amount of residing water that resides in the anode gas pump based on the circulation flow rate of the anode gas pump is performed with reference to pre-prepared relationship between the circulation flow rate of the anode gas pump and the amount of residing water that resides in the anode gas pump.

10. The method according to claim 6, wherein
the cathode gas pump is a compressor that changes the supply flow rate of the cathode gas through its rotation.

* * * * *